Oct. 5, 1965    J. J. SKUBAL    3,210,456
GROUND LEVEL HOUSING FOR ELECTRICAL APPARATUS
Filed Feb. 26, 1963    4 Sheets-Sheet 1
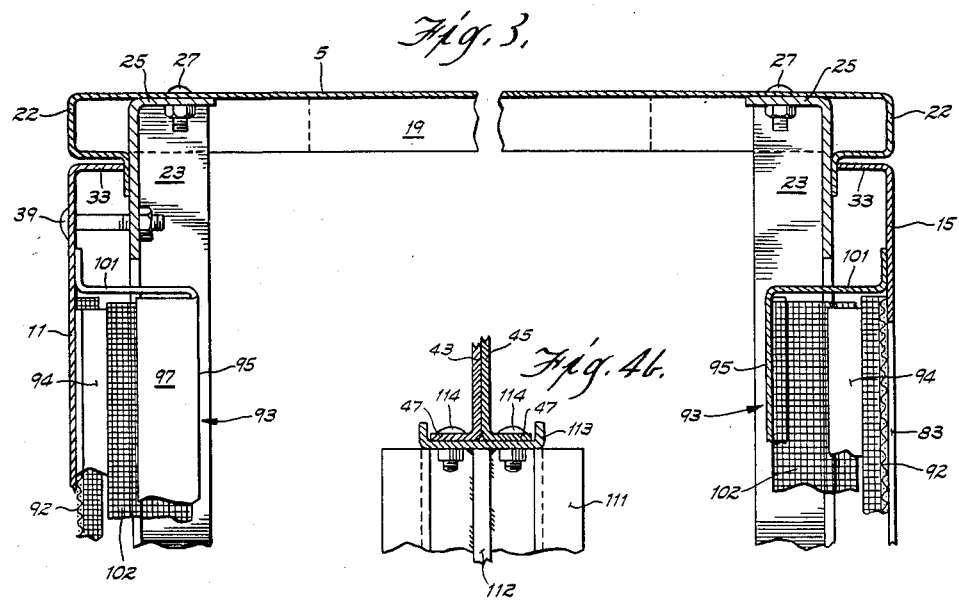
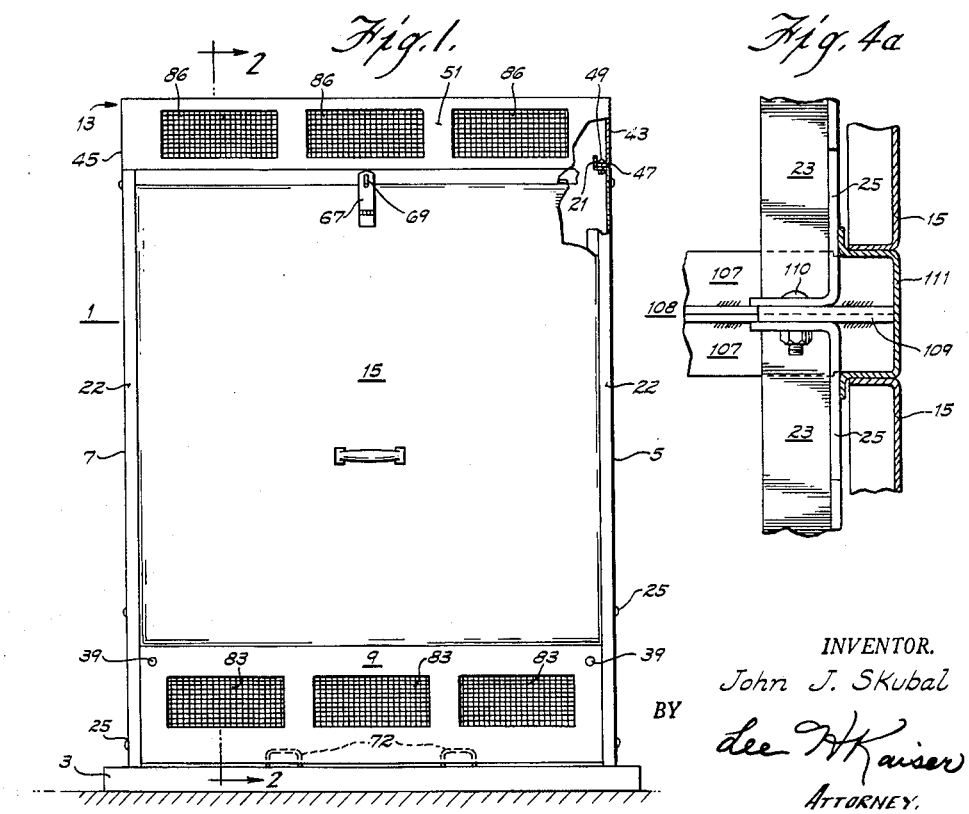
INVENTOR.
John J. Skubal
BY
Lee H. Kaiser
ATTORNEY.

Oct. 5, 1965    J. J. SKUBAL    3,210,456
GROUND LEVEL HOUSING FOR ELECTRICAL APPARATUS
Filed Feb. 26, 1963    4 Sheets-Sheet 3
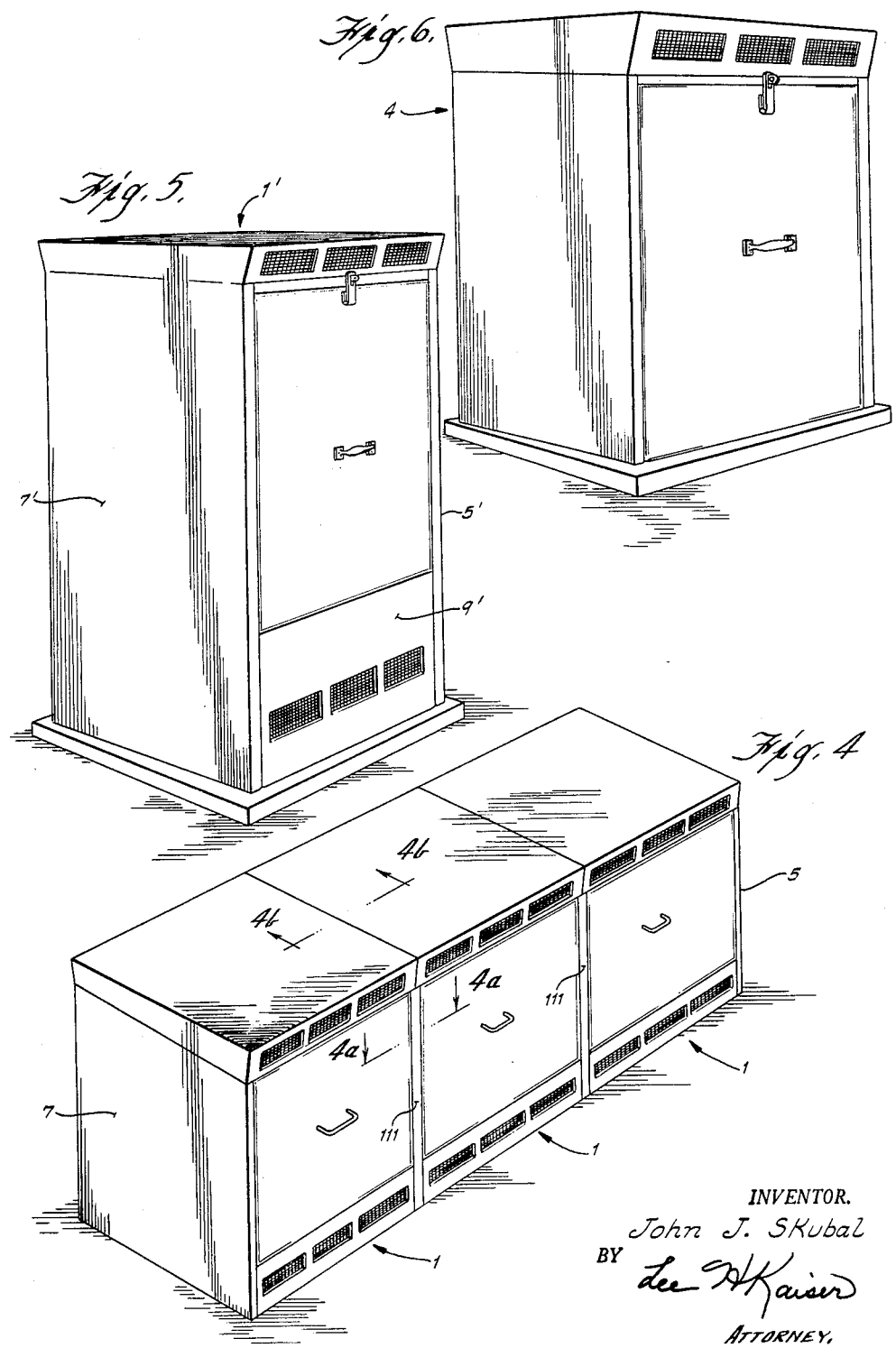
INVENTOR.
John J. Skubal
BY Lee H. Kaiser
ATTORNEY.

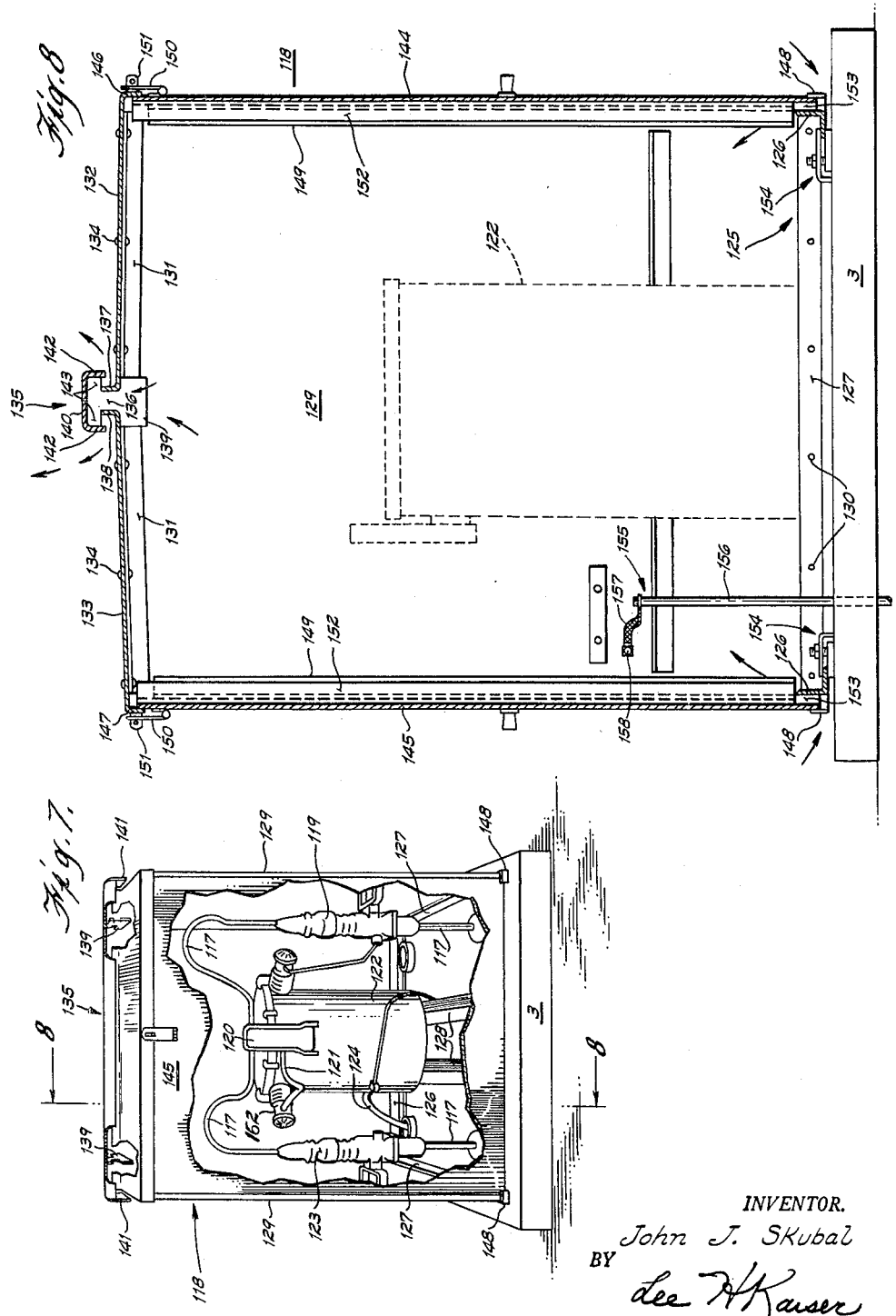

United States Patent Office 3,210,456
Patented Oct. 5, 1965

3,210,456
GROUND LEVEL HOUSING FOR ELECTRICAL
APPARATUS
John J. Skubal, West Allis, Wis., assignor to McGraw-Edison Company, Milwaukee, Wis., a corporation of Delaware
Filed Feb. 26, 1963, Ser. No. 267,375
23 Claims. (Cl. 174—16)

This application is a continuation-in-part of my application Serial No. 800,275, filed March 18, 1959, and now abandoned.

This invention relates to housings for electrical apparatus and more particularly to housings for completely enclosing electrical apparatus at ground level.

Underground electrical distribution systems have become increasingly popular in residential areas because they improve the appearance thereof as compared to the more common aerial distribution systems; and in general, because although the installation cost of an underground system is greater than that of an aerial system, the underground system represents a long-term savings in that it requires less attention and service as the tree limb, ice, sleet, etc. problems of the aerial system are eliminated. However, the possibility exists that some servicing may be required and therefore electrical apparatus used in connection with the distribution system, for example transformers, lightning arresters, etc., should be readily accessible to servicemen. On the other hand, as the electrical apparatus of the underground distribution system is mounted at or near ground level, it must be made safe and tamper-proof to protect the general public from injury.

Heretofore, semi-buried housings and buried vaults have been used in connection with underground distribution systems, and have not proven to be entirely suitable in that they do not afford ready access to the electrical apparatus contained therein, and their positioning in the ground prevents effective circulation of air therethrough to cool the electrical apparatus. The inability of the semi-buried housings and buried vaults to provide an effective cooling circulation of air necessitates de-rating the electrical apparatus contained therein, particularly the electrical transformers.

It is an object of this invention to provide a compact housing which will completely enclose the electrical apparatus of an underground electrical distribution system and yet will allow adequate dissipation of the heat generated by said electrical apparatus.

Another object of this invention is to provide a housing for electrical apparatus of an underground distribution system that is safe, tamper-proof, and yet provides ready and reliable access to the interior thereof to authorized personnel only.

Still another object is to provide a housing that can be easily assembled in the field to allow ready installation and which need only be partially disassembled for allowing maintenance or replacement of the electrical apparatus enclosed thereby.

A further object of this invention is to provide a number of different size housings for electrical apparatus, which housings can be assembled using substantially the same basic component parts to thereby facilitate manufacturing and warehousing.

A still further object of this invention is to provide a housing for electrical apparatus which is safe with regard to persons who may come in contact therewith in that the exterior surface thereof is free of protruding sharp edges and the housing itself is electrically grounded.

A more specific object is to completely enclose electrical apparatus mounted at ground level with a housing having vertically spaced baffled openings to allow convective circulation of air through the housing and yet prevent insertion of articles into the housing.

In accordance with this invention, the electrical apparatus of an underground distribution system, for example an electrical transformer, is mounted at ground level on a concrete pad and is completely enclosed by a compact, aesthetically pleasing, safe, tamper-proof housing that is assembled around the transformer after it has been mounted on the concrete pad. The housing includes screened, baffled openings at vertically spaced positions thereon which will allow air to convectively circulate through the housing to cool the electrical apparatus contained therein. The housing also includes removable, hingeless, door panels on the front and rear thereof which can be padlocked in position, whereby reliable, ready access to the interior of the housing is provided for authorized persons only.

Further objects and advantages of this invention will be evident from reading the following detailed description in connection with the drawings in which:

FIG. 1 is a front view of a preferred embodiment of the invention;

FIG. 3 is a cross-sectional view along lines 3—3 of FIG. 2;

FIG. 4 is a perspective view of an alternate embodiment of the invention;

FIG. 4a is a partial cross-sectional view taken along line 4a—4a of FIG. 4;

FIG. 4b is a partial cross-sectional view taken along line 4b—4b of FIG. 4;

FIG. 5 is a perspective view of a further embodiment of this invention;

FIG. 6 is a perspective view of still another embodiment of this invention;

FIG. 7 is a perspective view of still further embodiment of this invention; and

FIG. 8 is a cross-sectional view along line 8—8 of FIG. 7.

Figure 2:
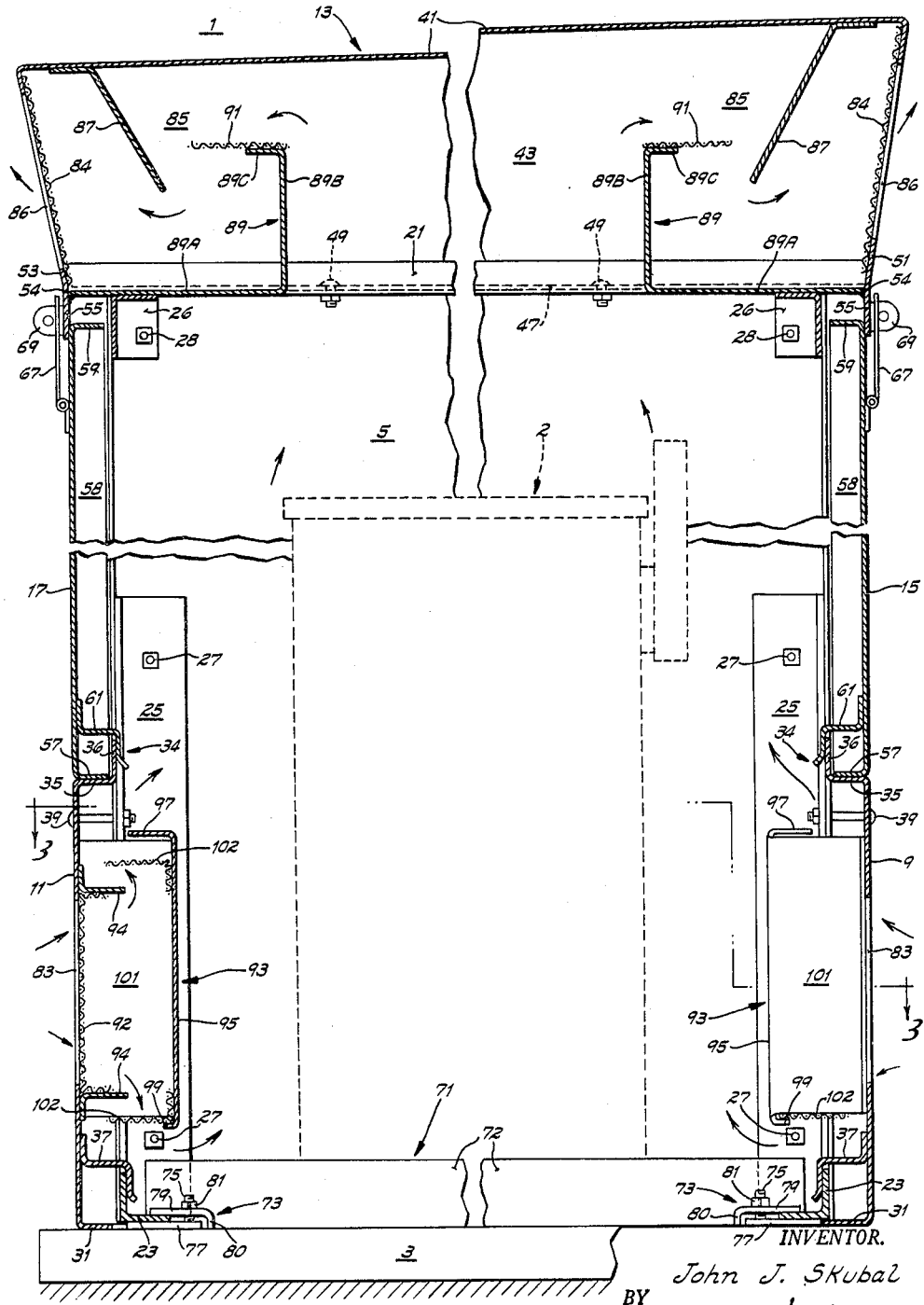
FIG. 2 is a cross-sectional view along lines 2—2 of FIG. 1.

In the preferred embodiment of this invention, housing means 1 is mounted on a concrete pad 3 to enclose the electrical apparatus, for example an electrical transformer 2 (shown schematically in FIG. 2), for an underground electrical distribution system. The housing means 1 comprises a pair of spaced, opposed, vertically extending side panels 5 and 7, a pair of relatively small spaced opposed, horizontally elongated panels 9 and 11 (front and back), a top or cover 13 and a pair of removable door panels 15 and 17 adapted to engage the assembled side panels 5 and 7, the horizontally elongated panels 9 and 11, and the cover 13 to complete the housing 1.

The component parts of the housing 1 are shipped in knocked-down sections to be assembled at the site of the underground distribution system. The structure is well adapted, when using relatively heavy electrical apparatus, to premounting of the apparatus on the concrete pad, and assembling the housing 1 around it, and it is subsequently adapted to servicing or replacement of the electrical apparatus enclosed by the housing 1 without complete disassembly of the housing 1. Should it become necessary to remove the electrical transformer 2 from the housing 1, the cover 13 can be detached from the housing 1 and by means of a crane, or other suitable device, the electrical transformer can be lifted through the top of the housing, a new transformer lowered into the housing 1 and the cover 13 replaced. In addition, the transformer could be removed by sliding it out either the front or rear of the housing 1 after removing the appropriate door panel 15 or 17 and its associated elongated panel 9 or 11.

Referring now to FIGS. 2 and 3, more specifically the side panels 5 and 7 of the housing 1 are each provided with a lower inwardly extending lip 19, an inwardly offset, upwardly extending, generally L-shaped lip 21 adjacent its upper end, and each of the vertical side edges comprising co-extensive Z-shaped end portions 22 to provide a seat for the panels 9–11 and the doors 15–17. A pair of lower, generally U-shaped, spreader angle members 23 have a base portion extending across the front and rear of the housing 1 with the ends of the base portions being supported by the lower lips 19 of the side panels 5 and 7, and vertically extending arm portions 25, which are located at opposed ends of the base 23 and are affixed to the side panels 5 and 7 by suitable fastening means such as bolts 27. The spreader angles 23–25 both maintain the spacing between the side panels 5–7 and the vertically extending portions 25 lend rigidity thereto. A pair of upper spreader angle members 26 (see FIG. 2) are fixed to the side panels 5 and 7, preferably by bolts 28, and maintain the upper spacing therebetween while also lending rigidity to the housing 1 should the cover 13 be removed to withdraw electrical appartaus from within the housing 1, as described above.

Each of the horizontally elongated front and back panels 9 and 11 is provided with an inwardly turned lower lip 31, an offset inwardly, vertically extending, generally L-shaped upper lip 34 adjacent its upper end (see FIG. 2) and having a horizontal portion 35 and a vertical portion 36, and in inwardly turned side edge 33 (see FIG. 3) extending between the upper and lower lip aforementioned. The elongated panels 9 and 11 extend across the lower front and rear of the housing 1 with the side edges 33 thereof interfitting with and engaging the Z-shaped portions 22 of the side panels 5 and 7 to bring the front and rear panels flush with the end surfaces of the side panels. Spaced a small distance upwardly from lip 31 of the panels 9 and 11 is a Z-shaped clip 37 which is secured thereto and is adapted to engage the lower spreader angle base portion 23 to position the panels 9 and 11 into the assembly, a pair of bolts 39 fixing the elongated panels 9 and 11 to the vertically extending end portions 25 of the spreader angles.

The top or cover 13 as here shown has a sloping roof 41 and two integral depending side portions 43 and 45 which each have a lip 47 at the lower end thereof, best illustrated in FIG. 1. The lip 47 rests on the upper L-shaped lip 21 of the side panels 5 and 7 and is fixed thereto by bolts 49. The cover 13 also includes integral front and rear portions 51 and 53 which slope gradually inwardly to a point 54 substantially coincident with the upper ends of the side panels 5 and 7 and are formed with vertically depending end portions 55.

The removable door panels 15 and 17 each have a lower inwardly extending lip portion 57 which rest on the horizontal portion 35 of the generally L-shaped upper lip 34 of each of the horizontally elongated front and rear panels 9 and 11. A Z-shaped clip 61 (substantially identical to clip 37) extends across the lower portion of each of the door panels 15 and 17 and engages the vertical portion 36 of the generally L-shaped upper lip 34 to hold the lower portions of the door panels 15 and 17 in assembled position. The vertically extending sides of door panels 15 and 17 are provided with inwardly extending lips 58 which engage the Z-shaped portions 22 of the side panels 5 and 7, and the upper ends of the door panels 15 and 17 are provided with inwardly extending lips 59 which engage the upper spreader angle 26. An upper portion of the door panels 15 and 17 fits between the cover depending end portions 55 and the upper spreader angle 26, depending portions 55 and spreader angle 26 preventing outward or inward movement of the door panels 15 and 17.

Referring to FIG. 2, it is seen that the door panels 15 and 17 are removed by lifting each door panel vertically until the Z-shaped clips 61 have cleared the vertical portion 36 of the upper lip 34, then swinging the lower end of the door panel outwardly and next sliding the upper portion of the door panel from between the upper spreader angle 26 and the depending portion 55 to free the doors from the housing 1. It should be noted that the door panels 15 and 17 are not on hinges; this is particularly advantageous in that access to interior of the housing may not be required until long after the initial installation and therefore should hinges be used it is possible they could be rusted and the door panels 15 and 17 could not be opened without a great deal of effort. The hingeless door panels 15 and 17 of the housing 1 then provide reliable access to the interior of the housing regardless of the length of time elapsing between openings thereof. A hasp strap 67 is near the top of each of the door panels 15 and 17, and a hasp bail 69 is welded to the vertically depending portions 55 of the cover 13 so that the housing 1 can be secured by a padlock (not shown), or any other suitable locking means, to prevent unauthorized access to the interior thereof.

Support means 71, comprising two spaced channel members 72, which rest on the concrete pad 3 and fit into cut-out portions (not shown) in the lower spreader angles 23, are adapted to hold the electrical transformer 2 in spaced relation with the concrete pad 3 to protect the bottom thereof from corrosion.

The housing 1 is fixed to the concrete pad 3 by four anchor means 73, two of which are illustrated and each of which comprises a stud 75 fixed to and protruding from the concrete pad. The anchor means also includes a flat washer 77, one end of which fits between the lower spreader angle 23 and the concrete pad 3, an L-shaped washer 79, the lip end 80 of which engages the concrete pad 3 and the opposite end of which rests on spreader angle 23, and a nut 81, all of which combine to fixedly mount the housing.

In a manner to be described hereinafter, the housing 1 is electrically grounded to the earth to render it safe to personnel who may come in contact therewith.

Means is provided for cooling the electrical transformer 2 contained within the housing 1 and comprises openings 83 in elongated front and rear panels 9 and 11 and openings 86 in the front and rear portions 51 and 53 of the cover 13. Openings 83 and 86 are disposed in vertically spaced relation on the housing 1 to allow air, under the influence of the heat generated by the electrical apparatus, to circulate convectively through the housing 1. The flow of the air is illustrated semidiagrammatically by the arrows in FIG. 2 and, as illustrated, air heated by the transformer 2 is expelled through the upper openings 86 in the cover 13 and cool air is drawn into the housing 1 through the lower openings 83 of the elongated panels 9 and 11. Therefore, by reason of the chimney effect, relatively cool air is continually convectively circulated past the transformer 2 and maintains the temperature within the housing 1 within operating limits and there is no need to derate the transformer 2, and further, for a given transformer, a relatively compact housing may be used.

To prevent foreign particles from blowing into the interior of housing 1 and further to prevent, for example, children from extending electrically conductive wires into the housing which might contact live parts of the equipment therein, screens 84 and baffle means 85 are provided for openings 86 in the cover 13 and screens 92 and baffle means 93 are provided for the openings 83 in the elongated panels 9 and 11. The screens 84 may be spot welded to the inner side of the front and rear portions 51 and 53 of the cover 13. Each of the baffle means 85 comprise a first member 87 dependingly fixed, preferably by welding, to the roof 41, and a second member 89 fixed, preferably by welding, to the front and rear portions 51 and 53 of the cover 13. The members 89 extend horizontally across the cover 13 behind the openings 86 and comprise a horizontal portion 89A extending away from front and rear portions 51 or 53. A vertical portion 89B of baffle member 89 extends from the inner end of portion 89A toward the roof 41 a distance sufficient to be vertically above the depending end of the first baffle 87. The baffle 89 also includes a second horizontal portion 89C attached to portion 89B which is bent back toward front or rear portions 51 and 53, respectively.

The baffle members 87, also extend across the cover 13 behind the openings 86 and terminate above the horizontal portion 89A of the second baffle member to provide a gap for air passage therebetween. Screening 91 may be added to baffle means 85 by fixing it to the horizontal portion 89C of member 89 to thereby further insure against extension of conductive articles into the interior of the housing 1.

Returning to the front and rear lower panels, screens 92 are positioned behind openings 83 by means of angle brackets 94 fixed to the inner surface of and extending across the elongated panels 9 and 11. The baffle means 93 provided for the openings 83 in the elongated panels 9 and 11 comprises a vertical baffle plate 95 spaced from and parallel to the elongated panels 9 and 11. The vertical plate 95 is formed with horizontal end portions 97 and 99 which extend toward but terminate short of panels 9 and 11 to provide an air gap therebetween, and further formed with end portions 101 which extend from plate 95 and are fixed to the inner surfaces of the elongated panels 9 and 11 to secure the baffle means 93 in position. Screening 102 may be fixed to the plate 95 as illustrated in FIG. 2 to further insure against extension of articles into housing 1. Thus it can be seen that the baffle means 93 and 85 will effectively prevent extension of electrically conductive articles into the interior of the housing 1 without substantially interfering with the flow of air into and out of the housing 1.

As illustrated in FIG. 4, a plurality of housings 1 may be placed in side-by-side relationship. In this form only outer side panels 5 and 7 are used and the inner side panels are omitted. Referring to FIG. 4a, the abutting housings 1 are connected by means comprising a pair of angle iron members 107 fixed to each other to form an inverted T-shaped member 108 which is preferably positioned between a spreader angle 23 of each of two adjacent housings 1. A gusset plate 109 is fixed to the vertical portion of the inverted T-shaped member 108 and extends vertically to a height substantially equal to that of vertical portion 25 of the lower spreader angle base members 23. The connection of the housings is made by suitable bolts 110, which pass through the vertical portion 25 of adjacent spreader angles 23 and gusset plate 109. A generally U-shaped member 111 extends vertically along the joint between adjacent housings 1 and provides a seat for the horizontally elongated panels and the removable door panels 15 and further provides a smooth surface that is flush with the outer surfaces thereof. Referring now to FIG. 4b, the upper connection for the covers 13 is provided by means comprising a vertical plate member 112 fixed to the upper end of the U-shaped member 111, and a horizontally extending U-shaped member 113 which is welded to the vertical plate 112 and the vertical U-shaped member 111. The horizontal U-shaped member 113 extends from the front to the rear of the housing 1 and the lower lips 47 of the sides 43 and 45 of a pair of abutting covers 13 rest thereon and are fixed thereto by suitable bolts 114. The gusset plate 109 and vertical plates 112 occupy the corners only of the frame structure of the housing 1; therefore the three housings 1 illustrated in FIG. 4 form one enclosure rather than three individual enclosures.

FIG. 5 illustrates a housing 1' assembled using substantially the same component parts as are used in assembling housing 1, and it is to be noted that housing 1' has a greater over-all vertical dimension than that of housing 1, which is achieved by employing elongated panels 9' and 11' (not shown) having a greater vertical dimension than that of panels 9 and 11 of housing 1. The side panels such as 7' have a greater vertical dimension also, all of which afford the accommodation of a taller transformer.

The embodiment illustrated in FIG. 6 is again similar, and the housing 4 is assembled using substantially the same component parts as those used for the housing 1 of FIG. 2, the only difference being the elimination of the elongated panels 9 and 11 and the use of side panels of reduced vertical dimension. As is best illustrated by FIG. 2, this is possible because the lower portions of the door panels 15 and 17, comprising lower lip 57 and Z-shaped clip 61, are similar to the lower portions of the elongated panels 9 and 11, which comprises lower lip 31 and Z-shaped clip 37. Therefore, it is possible to eliminate the elongated panels 9 and 11 and to engage the Z-shaped clips 61 of the door panels 15 and 17 directly to the spreader angles 23. This enclosure 4 is designed for a small transformer with low heat problems, the sweep of air from side-to-side through the cover being sufficient to cool the device.

Therefore, as has been shown and described, it is possible to vary the vertical size of the housing of the invention by replacing only the side panels and either replacing or eliminating the elongated panels. The horizontal dimension of the housing may be increased through use of a plurality of housings set in side-by-side relationship. This is highly advantageous from a manufacturing and warehousing point of view, and in addition, from the standpoint of an increase in the size of the housing in the field by substituting only a few components instead of replacing the entire structure.

Reference will now be made to FIGS. 7 and 8 for a discussion of another alternative embodiment of this invention. An example of the electrical apparatus which may be enclosed by any of the housings of this invention has been illustrated in detail in FIG. 7 for convenience, and it should be noted that the same apparatus can be enclosed in housings 1, 1', and 4 and would occupy the same relative position therein. As illustrated in FIG. 7, primary line leads 117 enter a housing 118 through the concrete pad 3, pass through a pothead 119 to a fuse cutout 120 from which a tap lead 121 connects the line leads to the primary side of a conventional oil-filled distribution transformer 122, having immersed in the oil a magnetic core linked in the usual manner by a secondary winding and also by a primary winding electrically connected to primary insulating bushing 162. Also the fuse cutout 120 has the line leads 117 which pass through another pothead 123 and out of the housing 118 through the concrete pad 3. The secondary leads 124 also leave the housing 118 through the concrete pad 3.

The housing 118 includes a base member 125 which, in addition to forming the structural base for the housing 118, holds the transformer 122 in spaced relation with the concrete pad 3 to reduce the danger of corrosion attacking the bottom of the transformer 122. The base member 125 comprises a pair of spaced apart end angles 126, a pair of side braces 127 welded to and connecting end angles 126, and a pair of cross angles 128 that support the transformer 122. The cross angles 128 are disposed parallel to the side braces 127 and the ends thereof are connected to the end angles 126. A vertically extending side panel 129 is fixed, preferably by bolts 130, to each of the side braces 127 and each side panel 129 carries a roof brace 131 at the upper end thereof.

The top of the housing 118 comprises a pair of roof members 132 and 133 which are fixed to the roof braces 131 of the side panels 129 by bolts 134 and a baffled vent means 135. The baffled vent means 135 comprises an opening 136 defined by upwardly projecting lips 137 and 138 of roof members 132 and 133, respectively. I-shaped plates 139 are disposed at horizontally opposed ends of opening 136 and provide a support for a vent hood 140 which is fixed to the I-shaped plates 139 and formed having the ends 141 thereof bent downwardly to prevent horizontal movement of the assembly consisting of the vent hood 140 and the I-shaped plates 139. The edges 142 of the hood 140 are bent downwardly and fixed in this depending position by welding them to the I-shaped plates 139. A pair of openings 143 are defined by the depending edges 142 of the vent hood 140 and the upwardly projecting lips 137 and 138 of the roof members 132 and 133 to provide an egress for heated air. The vent means 135 allows free passage of air therethrough but prevents extension of electrically conductive articles into the interior of the housing 118.

A pair of removable door panels 144 and 145 complete the housing 118 and fit behind depending lip portions 146 and 147 of the roof members 132 and 133. Four angle clips 148 are provided and are disposed in the lower corners of the housing 118 and welded to the side panels 129 for holding the door in assembled relation. Movement of the door panels 144 and 145 is prevented in an outward direction by lips 146 and 147 and the angle clips 148. Movement of the door in an inward direction is prevented by the end angles 126 of the base member 125 and by reinforcing angles 149 fixed to the inner surfaces of the side panels 129. A hasp strap 150 is fixed to each of the door panels 144 and 145 and a hasp bail 151 is fixed to each of the lip portions 146 and 147 of the roof members 132 and 133 so that the door panels may be locked in place to allow access to the interior of the housing 118 by authorized personnel only.

Reinforcing angles 152 are fixed to the inner sides of the door panels 144 and 145 and rest on the end angles 126 to hold the bottom of the door panels 144 and 145 in spaced relation to the concrete pad 3. Thus an opening 153 is provided through which air may enter the housing 118. Therefore, in a manner similar to that of housing 1 in FIG. 2 and as illustrated by the arrows in FIG. 8, air which is heated by the transformer 122 rises in the housing 118 and is expelled through vent means 135 and cool air is drawn into the housing 118 through the opening 153. A continuous convective flow of air is maintained past the transformer 122 to keep the temperature within the housing 118 within operating limits. In this embodiment, no additional baffling for opening 153 is needed to prevent extension of electrically conductive articles into the housing 118. This results by reason of the fact that the structure adjacent the opening 153 will substantially prevent the passage of articles through opening 153, and since all live parts of the transformer are mounted in the upper portion of the housing 118, they are inaccessible.

Anchor means 154 is provided to fix the housing 118 to the concrete pad 3 and is identical to the anchor means 73 used to connect the housing 1 to the pad 3, and thus will not be further described.

The housing 118 is electrically grounded by means 155 comprising an electrically conductive rod 156 protruding from the concrete pad 3 and extending into the earth a sufficient distance to insure proper grounding. The rod 156 may be driven through a preformed hole provided in the concrete pad 3 or it may be driven into the earth prior to the pouring of the concrete pad 3, which is later poured around it. Means 155 also comprises a wire 157, one end of which is fixed to the top of rod 156 and the other end of which is connected to the housing 118 by suitable means such as bolt 158. In the event that it should be necessary to paint housing 118 to protect it against corrosion, the hole (not shown) for bolt 158 may be marked to insure proper electrical contact.

It should be noted that the position of grounding means 155 is illustrative only and may be placed in any convenient position in the housing 118. Futher, a connecting or mounting bolt already a part of the housing 118 may be used instead of the additional bolt 158. It should also be noted that housings 1, 1', and 4 are also electrically grounded and it may be accomplished in a manner similar to that here described.

As has been shown and described, this invention provides for completely enclosing the electrical apparatus of an underground distribution system with a housing that is adapted to allow convective circulation of air therethrough to cool the electrical apparatus. Further, a housing is provided that is safe to persons who may come in contact therewith, tamper-proof, and which provides ready, reliable access to the electrical apparatus contained therein to authorized personnel only. The housings can be assembled in the field around pre-mounted equipment and hence is readily adaptable for use with both light or heavy electrical equipment. Still further, the design of the housings is such that a number of housing sizes are available using substantially the same basic component parts, which is particularly advantageous from both a manufacturing and a warehousing standpoint.

It should be noted that although the housings have been discussed with regard to electrical distribution equipment, they are as readily adaptable to enclosing other equipment, for example telephone equipment, or combinations of various equipment, for example electrical distribution equipment and telephone equipment.

Although I have described my invention with relation to specific embodiments, it is not intended that it be limited thereto, and the appended claims are intended to cover all modifications of the invention which are within the true spirit and scope thereof.

What I claim is:

1. A ground level electrical installation comprising, in combination, a three-dimensional concrete pad resting on the ground and being substantially solid in horizontal cross section and having its upper surface above ground level and conductor passage means extending therethrough, electrical apparatus supported above ground level on said upper surface, a metallic housing on said pad in surrounding relation to said electrical apparatus, an underground electrical cable extending through said conductor passage means in said concrete pad into the interior of said housing and being connected to said apparatus, means for grounding said housing, means for anchoring said housing to said concrete pad, said housing having an access opening therein of a size permitting personnel to enter said housing to repair and make electrical connections to said apparatus, a movable door member normally closing said access opening, means for locking said door member closed, said housing having an air intake opening adjacent the lower end of said electrical apparatus and an exhaust opening positioned above said electrical apparatus and air being circulated into the interior of said housing through said intake opening and past said apparatus and out of said exhaust opening and cooling said electrical apparatus by thermal convection.

2. A ground level installation in accordance with claim 1 and including baffle means within said housing opposite said intake and exhaust openings for preventing insertion of foreign objects into said housing through said openings.

3. A ground level installation in accordance with claim 2 wherein said housing has front and rear access openings therein of a size permitting personnel to enter said housing, a cover, opposed upright side panels, front and rear movable doors for closing said access openings, and means for locking said front and rear doors closed.

4. An installation in accordance with claim 3 wherein edges of said side panels and said doors mate with adjacent edges of said housing and one of each adjacent pair of said edges is offset and the other is turned in and said adjacent edges interfit and overlap and provide a smooth surface for said housing and obstruct entrance of moisture into said housing.

5. A ground level installation in accordance with claim 3 wherein said housing includes front and rear base spreader members on said concrete pad and said means for anchoring said housing are embedded in said concrete pad and engage said base spreader members.

6. A ground level installation in accordance with claim 5 wherein said housing includes front and rear panels smaller in height than said side panels and affixed to said base spreader members and said access openings are between said front and rear panels and said cover.

7. A ground level installation in accordance with claim 6 wherein edges of said side, front, and rear panels and said doors mate with adjacent edges of said housing and one of each adjacent pair of said edges is offset and the other is turned in and said adjacent edges interfit and overlap and provide a smooth surface for said housing and obstruct entrance of moisture into said housing.

8. A ground level installation in accordance with claim 6 wherein vertical members are secured adjacent the ends of said base spreader members and said front and rear panels are affixed to said vertical members and said air intake openings are in said front and rear panels.

9. A ground level installation in accordance with claim 5 and including front and rear upper spreader members positioned above said base spreader members and secured to said side panels and to said cover.

10. A ground level installation in accordance with claim 9 wherein the vertical edges of said side panels are bent over and offset and the vertical edges of said doors are turned in and mate with said offset edges of said side panels to provide a flush surface for said housing and said side panels are secured to said upper and said base spreader members.

11. A ground level installation in accordance with claim 2 wherein said housing includes a plurality of side-by-side casings and each casing has front and rear access openings and includes front and rear base spreader members, a cover, front and rear movable doors for closing said access openings, and means for locking said doors closed and wherein each end casing has an upright end panel and said housing includes front and rear vertical support members between each adjacent pair of casings connected to said base spreader members of both said pair of adjacent casings and also includes upper and lower horizontal members between each adjacent pair of casings affixed to said front and rear vertical support members between said adjacent pair of casings.

12. A ground level installation in accordance with claim 11 wherein each casing includes front and rear upper spreader members positioned above said base spreader members and connected to said vertical support members.

13. A ground level installation in accordance with claim 11 wherein each casing includes vertical members affixed adjacent the ends of said base spreader members and wherein said end panels of said end housings are affixed to said vertical members.

14. A ground level installation in accordance with claim 13 wherein each casing includes front and rear panels having air intake openings therein affixed to said vertical members and said access openings are between said front and rear panels and said cover and wherein edges of said end, front, and rear panels and said vertical support members and said doors mate with adjacent edges of said housing and one of each adjacent pair of said edges is offset and the other turned in and said adjacent edges interfit and overlap and provide a smooth surface for said housing and prevent entrance of moisture into said housing.

15. An aesthetically pleasing, safe, and tamper-proof residential distribution ground level transformer intsallation comprising, in combination, a three-dimensional concrete pad supported on the ground and being substantially solid in horizontal cross section and having conductor passage means extending therethrough, a metallic housing supported on the upper surface of said concrete pad above ground level, means for anchoring said housing to said pad, a container within said housing supported on the upper surface of said pad above ground level and enclosing an electrical transformer, an underground primary electrical cable extending through said conductor passage means in said pad into the interior of said housing and being connected to the primary side of said transformer, an underground secondary cable extending through said conductor passage means in said concrete pad into the interior of said housing and connected to the secondary side of said transformer, said housing having an access opening therein and a movable closure member normally closing said access opening and permitting access to the interior of said housing, means for locking said closure member, and means for grounding said metallic housing.

16. A ground level transformer installation in accordance with claim 15 wherein said transformer has primary and secondary windings and including a primary electrical switch within said housing in series with said primary cable and said primary winding and wherein said switch may be operated by authorized personnel through said access opening to permit disconnection of said primary winding from said primary cable and wherein said secondary cable is connected to said secondary winding.

17. A ground level transformer installation in accordance with claim 16 and including an insulating dielectric fluid within said container and a primary insulating bushing on said container and wherein said primary cable is in series with said switch, said primary bushing, and said primary winding.

18. A ground level transformer installation in accordance with claim 16 and including another underground primary cable extending through said conductor passage means in said concrete pad into the interior of said housing and being connected to said switch.

19. A ground level transformer installation in accordance with claim 18 and including cable terminating means within said housing for both of said primary cables.

20. A ground level transformer installation in accordance with claim 16 and including fuse means within said housing in series with said primary winding and said switch and said primary cable.

21. A ground level transformer installation in accordance with claim 15 and including an insulating dielectric fluid within said container and fuse means within said housing and wherein said transformer has primary and secondary windings and wherein said primary winding is in series with said primary cable and said fuse means.

22. A ground level transformer installation in accordance with claim 15 and including insulating dielectric fluid within said container and wherein said housing has an air intake opening therein adjacent the lower end of said container and an exhaust opening positioned above said container and wherein air is circulated through said intake opening and past said container and out of said exhaust opening and cools said container by thermal convection.

23. A ground level transformer installation in accordance with claim 15 wherein said transformer has primary and secondary windings and including primary electrical switch means within said housing in series with said primary cable and said primary winding, a second underground primary cable extending through said conductor passage means in said concrete pad into the interior of said housing and begin connected to said switch means, and cable terminating means within said housing for both of said underground primary cables and wherein said switch means may be operated by authorized personnel through said access opening when said closure member is open.

References Cited by the Examiner

UNITED STATES PATENTS

| | | | |
|---|---|---|---|
| 2,024,742 | 12/35 | Parsons | 174—37 X |
| 2,100,721 | 11/37 | Parsons | 174—37 X |
| 2,340,727 | 2/44 | Zelt | 336—59 |
| 2,717,275 | 9/55 | Hayden et al. | 174—37 |
| 2,824,939 | 2/58 | Claybourn et al. | 174—16 |
| 2,831,913 | 4/58 | Okenfuss | 174—51 |
| 2,853,541 | 9/58 | Lindgren | 174—35 |
| 2,876,275 | 3/59 | Schulz | 174—35 |
| 2,975,227 | 3/61 | Wiater et al. | 174—52 |

JOHN F. BURNS, *Primary Examiner.*

JOHN P. WILDMAN, DARRELL L. CLAY, *Examiners.*